(12) United States Patent
Ito et al.

(10) Patent No.: US 8,620,598 B2
(45) Date of Patent: Dec. 31, 2013

(54) BUSHING PRESS-FITTING INSPECTION DEVICE, METHOD, AND PROGRAM, AND BUSHING PRESS-FITTING APPARATUS

(75) Inventors: Masami Ito, Inabe (JP); Yoshirou Kitano, Inabe (JP)

(73) Assignee: Kobe Steel, Ltd., Kobe-shi (JP)

( * ) Notice: Subject to any disclaimer, the term of this patent is extended or adjusted under 35 U.S.C. 154(b) by 343 days.

(21) Appl. No.: 13/116,357

(22) Filed: May 26, 2011

(65) Prior Publication Data

US 2011/0301875 A1  Dec. 8, 2011

(30) Foreign Application Priority Data

Jun. 8, 2010 (JP) ................................. 2010-130922

(51) Int. Cl.
*G01L 1/00* (2006.01)

(52) U.S. Cl.
USPC .......................................................... 702/41

(58) Field of Classification Search
USPC .......................................................... 702/41
See application file for complete search history.

(56) References Cited

U.S. PATENT DOCUMENTS 4,284,604 A * 8/1981 Tervamaki .................... 422/517

FOREIGN PATENT DOCUMENTS

| CN | 201405184 Y | 2/2010 |
|---|---|---|
| JP | 61-46330 A | 3/1986 |
| JP | 2006-297564 | 11/2006 |

OTHER PUBLICATIONS

Combined Chinese Office Action and Search Report Issued Apr. 3, 2013, in Chinese Patent Application No. 201110119304.6 with English translation and English translation of category of cited documents.

* cited by examiner

Primary Examiner — Tung S Lau
(74) Attorney, Agent, or Firm — Oblon, Spivak, McClelland, Maier & Neustadt, L.L.P.

(57) ABSTRACT

A bushing press-fitting inspection device that can perform an inspection in any state between the beginning of press-fitting and the end of press-fitting as to whether or not the press-fitting has been satisfactorily performed is provided. The bushing press-fitting inspection device is used in a bushing press-fitting apparatus that, using a press-fitting mechanism, supports a bushing at an end of the bushing press-fitting apparatus and that press-fits, over a certain stroke at a certain load, the bushing into a bushing press-fitting portion formed in part of a structure in a cylindrical shape that is included in a workpiece. The bushing press-fitting inspection device includes setting means, storage means, input means, judgment means, and output means.

8 Claims, 4 Drawing Sheets

BUSHING PRESS-FITTING INSPECTION DEVICE, METHOD, AND PROGRAM, AND BUSHING PRESS-FITTING APPARATUS

BACKGROUND OF THE INVENTION

1. Field of the Invention

The present invention relates to a bushing press-fitting inspection device, method, and program for performing an inspection when a bushing is press-fitted into a bushing press-fitting portion provided in part of a structure, and to a bushing press-fitting apparatus.

2. Description of the Related Art

Various configurations have been proposed for a bushing press-fitting apparatus for press-fitting a bushing into a bushing press-fitting hole provided in a structure. For example, a bushing press-fitting apparatus according to related art has a hold-and-move unit that holds and moves a structure having a bushing press-fitting hole into which a bushing is to be inserted, a press-fitting unit that press-fits a bushing into the bushing press-fitting hole after the hold-and-move unit has moved the structure, a bushing supply unit that supplies a bushing to the press-fitting unit, and an attachment replacing unit that replaces, in accordance with the specifications of a bushing, an attachment that is set on the press-fitting unit and that is used to press-fit a bushing (refer to Japanese Unexamined Patent Application Publication No. 2006-297564).

Even if the type of bushing to be used is changed, the bushing press-fitting apparatus according to the related art can be used by using the attachment replacing unit that replaces an attachment with another attachment corresponding to the bushing. Therefore, the bushing press-fitting apparatus according to the related art can handle a structure into which a plurality of types of bushings are to be press-fitted.

In addition, a suspension arm, which is an underbody component of an automobile and a specific example of a structure, or the like may be made of an iron alloy or an aluminum alloy. A bushing press-fitting apparatus is also used for work in which a bushing is press-fitted into a bushing press-fitting hole in such an underbody component of an automobile. It is to be noted that, especially when an underbody component of an automobile is made of an aluminum alloy, which is soft compared to an iron alloy and therefore liable to be deformed when a bushing is press-fitted thereinto, a bushing press-fitting apparatus is configured to press-fit bushings one by one even if there are a plurality of bushing press-fitting holes.

In general, a bushing press-fitting apparatus uses a hydraulic mechanism to press-fit a bushing into a bushing press-fitting hole.

In a bushing press-fitting apparatus according to the related art, however, a bushing press-fitting inspection device, which inspects a state in which a bushing is press-fitted by the bushing press-fitting apparatus, performs an inspection of the press-fitting status of a bushing at the beginning of press-fitting or at the end of press-fitting. Therefore, it has been impossible to deal with a case in which a failure occurs between the beginning of press-fitting and the end of press-fitting.

SUMMARY OF THE INVENTION

The present invention has been established in view of the above-described problem. An object of the present invention is to provide a bushing press-fitting inspection device, a bushing press-fitting inspection method, and a bushing press-fitting inspection program that make it possible to perform an inspection in any state between the beginning of press-fitting and the end of press-fitting as to whether or not the press-fitting has been satisfactorily performed, and to provide a bushing press-fitting apparatus.

An bushing press-fitting inspection device used in a bushing press-fitting apparatus that, using a press-fitting mechanism, supports a bushing at an end of the bushing press-fitting apparatus and that press-fits, over a certain stroke at a certain load, the bushing into a bushing press-fitting portion formed in part of a structure in a cylindrical shape that is included in a workpiece is configured to include setting means, storage means, input means, judgment means, and output means.

According to this configuration, the bushing press-fitting inspection device sets, by using the setting means, a start point lower limit load and a start point upper limit load, which are represented by a relationship between a stroke and a load at the beginning of press-fitting of the bushing that is to be press-fitted using the press-fitting mechanism, and an end point lower limit load and an end point upper limit load, which are represented by a relationship between a stroke and a load at the end of press-fitting of the bushing, as press-fitting conditions in advance. The bushing press-fitting inspection device stores the press-fitting conditions that have been set by using the setting means in the storage means. When actual press-fitting work (a press-fitting operation) is started, the bushing press-fitting inspection device judges, by performing a comparison, whether or not an actual load that corresponds to an actual stroke and that has been input by the input means is within a region of the press-fitting conditions stored in the storage means. The bushing press-fitting inspection device then, by using the output means, outputs an indication signal to indication means provided in the press-fitting mechanism after receiving a satisfactory-result signal or an unsatisfactory-result signal from judgment means.

In addition, in the bushing press-fitting inspection device, the judgment means is configured to include calculation means and comparison means.

According to this configuration, the bushing press-fitting inspection device calculates, by using the calculation means in the judgment means, relationships of the actual load corresponding to the actual stroke input from the input means in relation to an intersection point on a line connecting the start point lower limit load to the end point lower limit load and an intersection point on a line connecting the start point upper limit load to the end point upper limit load. The bushing press-fitting inspection device then judges, by performing a comparison using the comparison means in the judgment means, whether or not the actual load is within a region of the press-fitting conditions that has been calculated.

Furthermore, the bushing press-fitting inspection device sets, by using the setting means, a maximum load corresponding to a maximum stroke and a period of time during which the maximum load is applied in advance and is configured to include maximum load judgment means.

According to this configuration, the bushing press-fitting inspection device sets, by using the setting means, the maximum load corresponding to the maximum stroke and the period of time during which the maximum load is applied in advance and causes the storage means to store the maximum load and the period of time. The bushing press-fitting inspection device then judges, by using the maximum load judgment means, that a press-fitting operation has been completed when an actual load corresponding to an actual maximum stroke has been applied over the period of time, which has been set, during which the maximum load is applied, and outputs a satisfactory-result signal to the output means.

In the bushing press-fitting inspection device, the output means is configured to, upon receiving satisfactory-result signals output from the maximum load judgment means and from the judgment means, output, to the indication means, indication signals that are different when the satisfactory-result signal is output from the maximum load judgment means and when the satisfactory-result signal is output from the judgment means.

According to this configuration, in the bushing press-fitting inspection device, whether or not the press-fitting state of a bushing is satisfactory and whether or not the press-fitting operation of a bushing has been completed can be judged by using the indication means.

In addition, the bushing press-fitting inspection device may be configured to include history writing means.

According to this configuration, the bushing press-fitting inspection device can store, by using the history writing means, each value used for the judgments made by the judgment means and the maximum load judgment means in the storage means and use the history of each stored value.

In addition, a bushing press-fitting inspection program according to an aspect of the present invention is configured to cause a computer to function as setting means, input means, calculation means, comparison means, and output means, in order to inspect a press-fitting status of a bushing used in a bushing press-fitting apparatus that, using a press-fitting mechanism, supports a bushing at an end of the bushing press-fitting apparatus and that press-fits, over a certain stroke at a certain load, the bushing into a bushing press-fitting portion formed in part of a structure in a cylindrical shape that is included in a workpiece.

According to this configuration, the bushing press-fitting inspection program sets, by using the setting means, press-fitting conditions in storage means, calculates, by using the calculation means, the press-fitting conditions as the formula of lines when an actual load corresponding to an actual stroke is input by the input means, judges, by performing a comparison using the comparison means, whether or not the actual load is within a region of the press-fitting conditions, and outputs, by using the output means, an indication signal corresponding to a satisfactory-result signal or an unsatisfactory-result signal to indication means.

Furthermore, a bushing press-fitting inspection method according to an aspect of the present invention includes the steps of setting press-fitting conditions in storage means by using setting means, inputting an actual load corresponding to an actual stroke by using input means, judging, by performing a comparison using judgment means, whether or not the actual stroke is within a region of the press-fitting conditions that have been set, and outputting a result of the judgment to indication means as an indication signal by using output means.

According to this procedure, because the bushing press-fitting inspection method uses a region between a line connecting a start point lower limit load to a start point upper limit load, which are represented by a relationship between a stroke and a load at the beginning of press-fitting of the bushing that is to be press-fitted using the press-fitting mechanism, and a line connecting an end point lower limit load to an end point upper limit load, which are represented by a relationship between a stroke and a load at the end of press-fitting of the bushing, as press-fitting conditions, it is possible to judge whether or not the actual load is satisfactory by performing a comparison with the region.

In addition, a bushing press-fitting apparatus according to an aspect of the present invention is configured to have the bushing press-fitting inspection device described above and include a support mechanism that supports a workpiece having a bushing press-fitting portion formed in part of a structure in a cylindrical shape included in the workpiece, a workpiece fixing mechanism that fixes in place the workpiece supported by the support mechanism, a bushing aligning mechanism that aligns a bushing that is to be press-fitted into the bushing press-fitting portion, a press-fitting mechanism that receives the bushing from the bushing aligning mechanism and press-fit the bushing into the bushing press-fitting portion of the workpiece that is supported by the support mechanism and that is fixed in place by the workpiece fixing mechanism.

According to this configuration, the bushing press-fitting apparatus supports a workpiece with the support mechanism, receives a bushing from the bushing aligning mechanism, and press-fits the bushing into the bushing press-fitting portion of a workpiece by using the press-fitting mechanism. When press-fitting the bushing, the bushing press-fitting apparatus inspects the press-fitting status of the bushing by judging, through a comparison with the actual load, a start point lower limit load and a start point upper limit load, which are represented by a relationship between a stroke and a load at the beginning of press-fitting of the bushing that is to be press-fitted using the press-fitting mechanism, and an end point lower limit load and an end point upper limit load, which are represented by a relationship between a stroke and a load at the end of press-fitting of the bushing (a region between a line connecting the upper limit loads and a line connecting the lower limit loads) as press-fitting conditions.

It is to be noted that the bushing press-fitting apparatus according to the aspect of the present invention may further include a lubricant applying mechanism configured to apply lubricant to the bushing.

According to this configuration, the bushing press-fitting apparatus can reduce the friction between the bushing press-fitting portion formed in part of a structure in a cylindrical shape and the bushing by using the lubricant applying mechanism, which enables a smoother execution of the press-fitting operation.

The bushing press-fitting inspection device, the bushing press-fitting inspection program, the bushing press-fitting inspection method, and the bushing press-fitting apparatus according to the aspects of the present invention produce the excellent effects described below.

The bushing press-fitting inspection device performs an inspection of a bushing that has been press-fitted as to whether or not the press-fitting of the bushing has been satisfactorily performed by setting a region as press-fitting conditions and by judging whether or not an actual value is within the region. Therefore, the press-fitting status of a bushing can be inspected at any time between the beginning of press-fitting and the end of press-fitting.

The bushing press-fitting inspection device sets a region between a line connecting the start point lower limit load to the end point lower limit load and a line connecting the start point upper limit load to the end point upper limit load as press-fitting conditions. Therefore, the press-fitting status of a bushing can be judged using any value of the actual load corresponding to the actual stroke.

The bushing press-fitting inspection device can judge, by using the maximum load judgment means, that a press-fitting operation has been completed when a preset period of time during which a maximum load corresponding to a maximum stroke is applied has elapsed. The judgment makes it easy to determine when to replace a workpiece into which a bushing has been press-fitted is replaced with a next workpiece.

In the bushing press-fitting inspection device, the output means can cause the indication means to give different indications in accordance with satisfactory-result signals output from the maximum load judgment means and the comparison means. Therefore, a worker can easily recognize an indication.

The bushing press-fitting inspection device can store the status history of the transition of the actual load corresponding to the actual stroke in relation to press-fitting conditions set by the history writing means. Therefore, the status history can be reflected in the next work.

In the bushing press-fitting inspection program according to the aspect of the present invention, a judgment is made after setting a region between a line connecting the start point lower limit load to the end point lower limit load and a line connecting the start point upper limit load to the end point upper limit load as press-fitting conditions. Therefore, the press-fitting status of a bushing can be judged using any value of the actual load corresponding to the actual stroke.

In the bushing press-fitting inspection method according to the aspect of the present invention, press-fitting conditions are compared with the actual load corresponding to the actual stroke in a region between lines. Therefore, the press-fitting status of a bushing can be inspected at any time between the beginning of press-fitting and the end of press-fitting.

The bushing press-fitting apparatus according to the aspect of the present invention can judge a workpiece to be a defective product whenever press-fitting conditions are not satisfied between the beginning of press-fitting and the end of press-fitting. Therefore, improvement of the quality of workpieces can be realized.

DESCRIPTION OF THE PREFERRED EMBODIMENTS

Embodiments of the present invention will be described in detail hereinafter with reference to the drawings.

Figure 2:
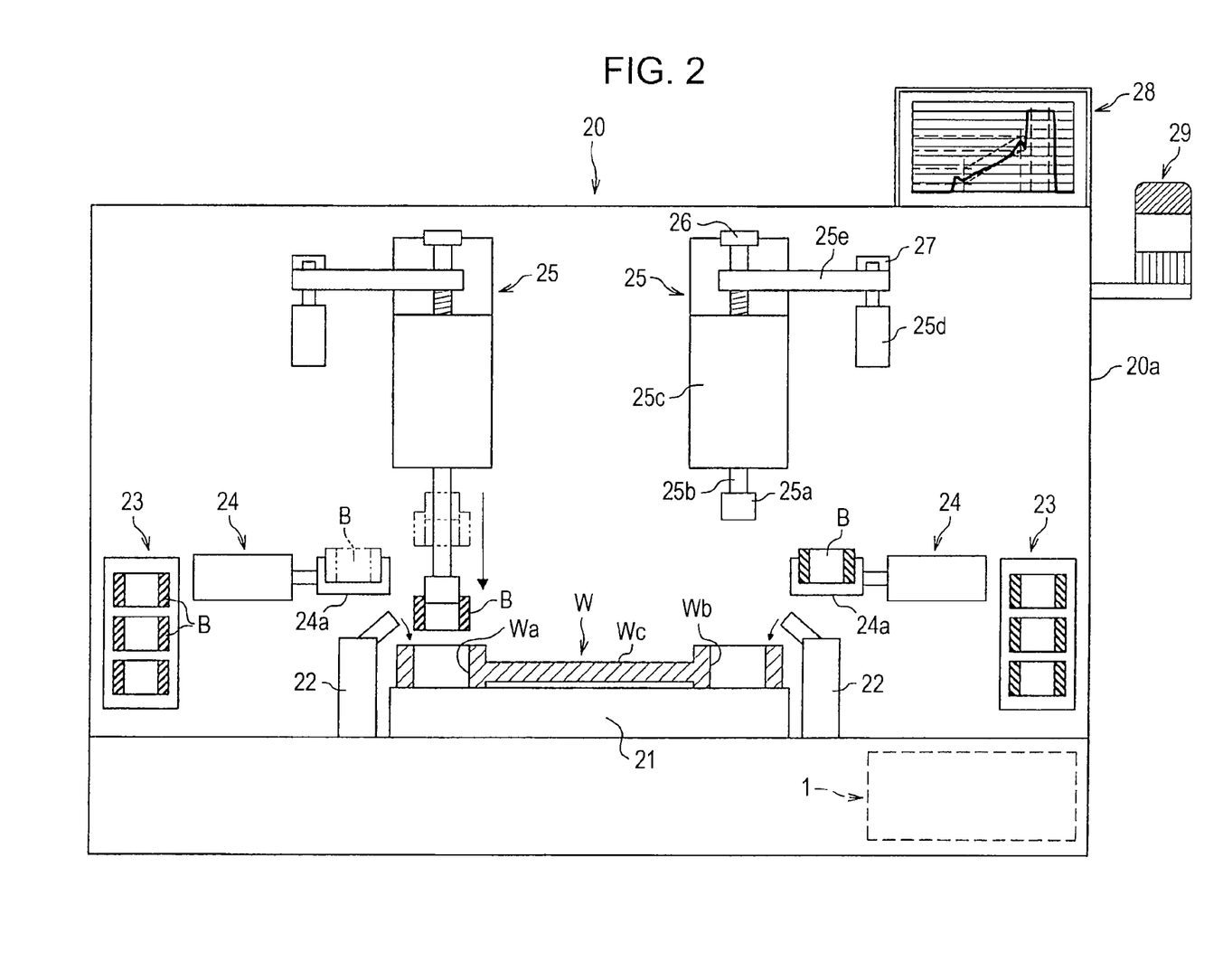
FIG. 2 is a schematic diagram illustrating the entirety of a bushing press-fitting apparatus according to an embodiment of the present invention.

As illustrated in FIG. 2, a bushing press-fitting apparatus 20, for example, press-fits bushings B into bushing press-fitting portions Wa and Wb formed in each of arms (workpieces) W that are used for automobiles. The bushing press-fitting apparatus 20 mainly includes a support mechanism 21 that supports the workpieces W, workpiece fixing mechanisms 22 that fix the workpieces W in place, bushing aligning mechanisms 23 that align the bushings B with one another, lubricant applying mechanisms 24 that apply lubricant to the bushings B, and press-fitting mechanisms 25 that press-fit the bushings B into the workpieces W. The bushing press-fitting apparatus 20 further includes a bushing press-fitting inspection device 1 that inspects the states of the bushings B that are press-fitted by the press-fitting mechanisms 25.

The bushing press-fitting apparatus 20 is configured to inspect the states of the bushings B with the bushing press-fitting inspection device 1 when the bushings B are press-fitted by the press-fitting mechanisms 25. The bushing press-fitting apparatus 20 has a monitor 28, which is a touch panel for inputting press-fitting conditions and the like under which the bushings B are to be press-fitted, and indication means 29 such as a lamp that indicates whether or not press-fitting of the bushings B has been satisfactorily performed.

As illustrated in FIG. 2, the support mechanism 21 supports the workpieces W mounted thereon when the bushings B are press-fitted into the workpieces W. The support mechanism 21 is configured to be able to arrange the workpieces W such that the workpieces W are aligned with one another.

The workpiece fixing mechanisms 22 fix in place the workpieces W supported by the support mechanism 21. The workpiece fixing mechanisms 22 fix the workpieces W in place by causing contact portions thereof to come into contact with the workpieces W in such a way that the positions of the bushing press-fitting portions Wa and Wb match preset positions.

The bushing aligning mechanisms 23 are arranged, when viewed from the front of an apparatus case 20a, on the left and right inside the apparatus case 20b. The bushing aligning mechanisms 23 align the bushings B, which have tubular shapes, supplied into the apparatus case 20a with one another in a plurality of lines (may be in a single line) by using the inclination thereof. The bushing aligning mechanisms 23 then deliver the leading ones of the bushings B to the lubricant applying mechanisms 24.

The lubricant applying mechanisms 24 receive, with handlers 24a thereof, the leading ones of the bushings B that have been aligned with one another by the bushing aligning mechanisms 23, and apply lubricant to necessary portions of the bushings B by, for example, spreading or spraying the lubricant. The lubricant applying mechanisms 24 receive the bushings B from the bushing aligning mechanisms 23 by holding the bushings B with the handlers 24a and move the bushings B to certain positions. Lubricant is applied to certain portions of the bushings B in the positions of the lubricant applying sections, which are not illustrated. The bushings B to which lubricant has been applied by the lubricant applying mechanisms 24 are then set, by moving the handlers 24a, in positions at which the bushings B are delivered to the press-fitting mechanisms 25.

The support mechanism 21, the workpiece fixing mechanisms 22, the bushing aligning mechanisms 23, and the lubricant applying mechanisms 24 that have been described above may each have a known configuration that is usually adopted by the bushing press-fitting apparatus 20. It is to be noted that although a configuration that includes the lubricant applying mechanisms 24 has been described, the lubricant applying mechanisms 24 may be replaced by supply mechanisms that supply the bushings B to the press-fitting mechanisms 25. That is, in the bushing press-fitting apparatus 20, the bushings B may be ones to which lubricant is applied in advance or ones that allow the bushing press-fitting apparatus 20 to have a configuration in which lubricant is not applied, depending on the type thereof.

The press-fitting mechanisms 25 receive the bushings B to which lubricant has been applied and press-fit the bushings B that have been received into the bushing press-fitting portions Wa and Wb of the workpieces W. Here, the press-fitting mechanisms 25 use servo cylinders. The press-fitting mechanisms 25 have support heads 25a that support the bushings B at the ends thereof, rods 25b that vertically move the support heads 25a, cylinders 25c that guide the rods 25b, drive motors 25d that drive the rods 25b guided by the cylinders 25c in a rotating manner, and transmission means 25e that transmits the driving force of the drive motors 25d to the rods 25b. The press-fitting mechanisms 25 also have encoders 26 as detection means that detects the rotary drive (the number of rotations) of the rods 25b and load cells 27 as detection means that detects the torque applied to driving shafts of the drive motors 25d. Values measured with the encoders 26 and the load cells 27 are output to the bushing press-fitting inspection device 1 as information regarding an actually measured stroke and an actually measured load.

The press-fitting mechanisms 25 rotate the rods 25b through the transmission means 25e by using the drive motors (servo motors) 25d that operate in accordance with signals input from apparatus drive control means, which is not illustrated. In the press-fitting mechanisms 25, when the rods 25b are guided by the cylinders 25c and rotate, the rotation causes the rods 25b to move up or down. Distances over which the rods 25b move down from their respective origins, which are the upper ends of the movement, are regarded as strokes. In addition, in the press-fitting mechanisms 25, the load cells 27 detect torques applied to the driving shafts of the drive motors 25d, and loads applied to the bushings B when the bushings B are press-fitted are calculated from the torques and then output.

Figure 1:
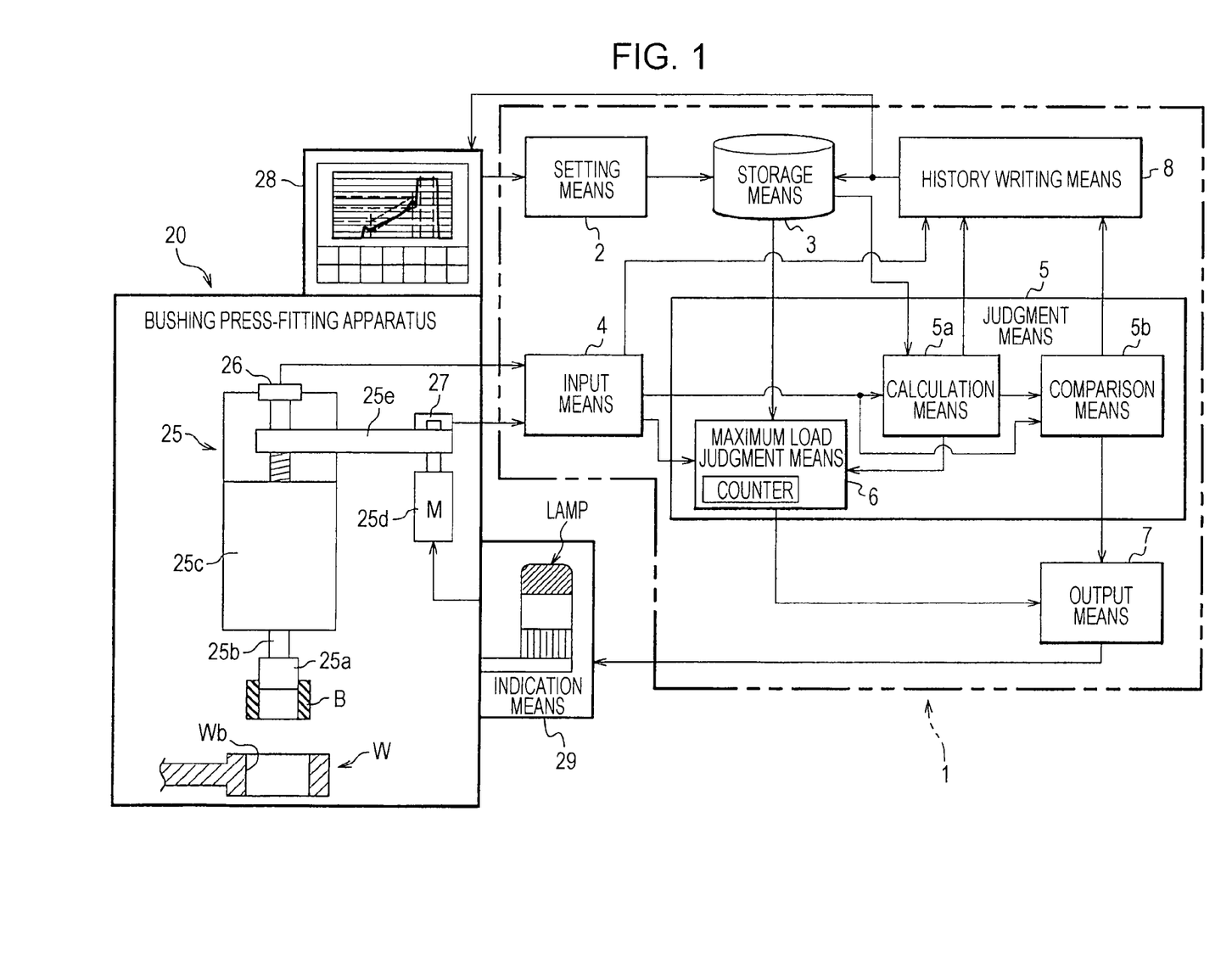
FIG. 1 is a block diagram illustrating the overall configuration of a bushing press-fitting inspection device according to an embodiment of the present invention.

The bushing press-fitting inspection device 1 inspects the press-fitting statuses of the bushings B on the basis of the information regarding the actually measured stroke and the actually measured load that is transmitted from the press-fitting mechanisms 25 of the bushing press-fitting apparatus 20. The bushing press-fitting inspection device 1 has, as illustrated in FIG. 1, setting means 2, storage means 3, input means 4, judgment means 5, maximum load judgment means 6, output means 7, and history writing means 8.

The setting means 2 sets the press-fitting conditions of the bushings B input from the monitor 28, which is a touch panel on the bushing press-fitting apparatus 20. The setting means 2 causes the storage means 3 to store the press-fitting conditions input from the monitor 28. Here, as the press-fitting conditions, loads corresponding to strokes are set by the setting means 2. The loads set by the setting means 2 include a start point lower limit load, a start point upper limit load, an end point lower limit load, and an end point upper limit load corresponding to predetermined strokes, and further include a maximum load corresponding to a maximum stroke.

Figure 3:
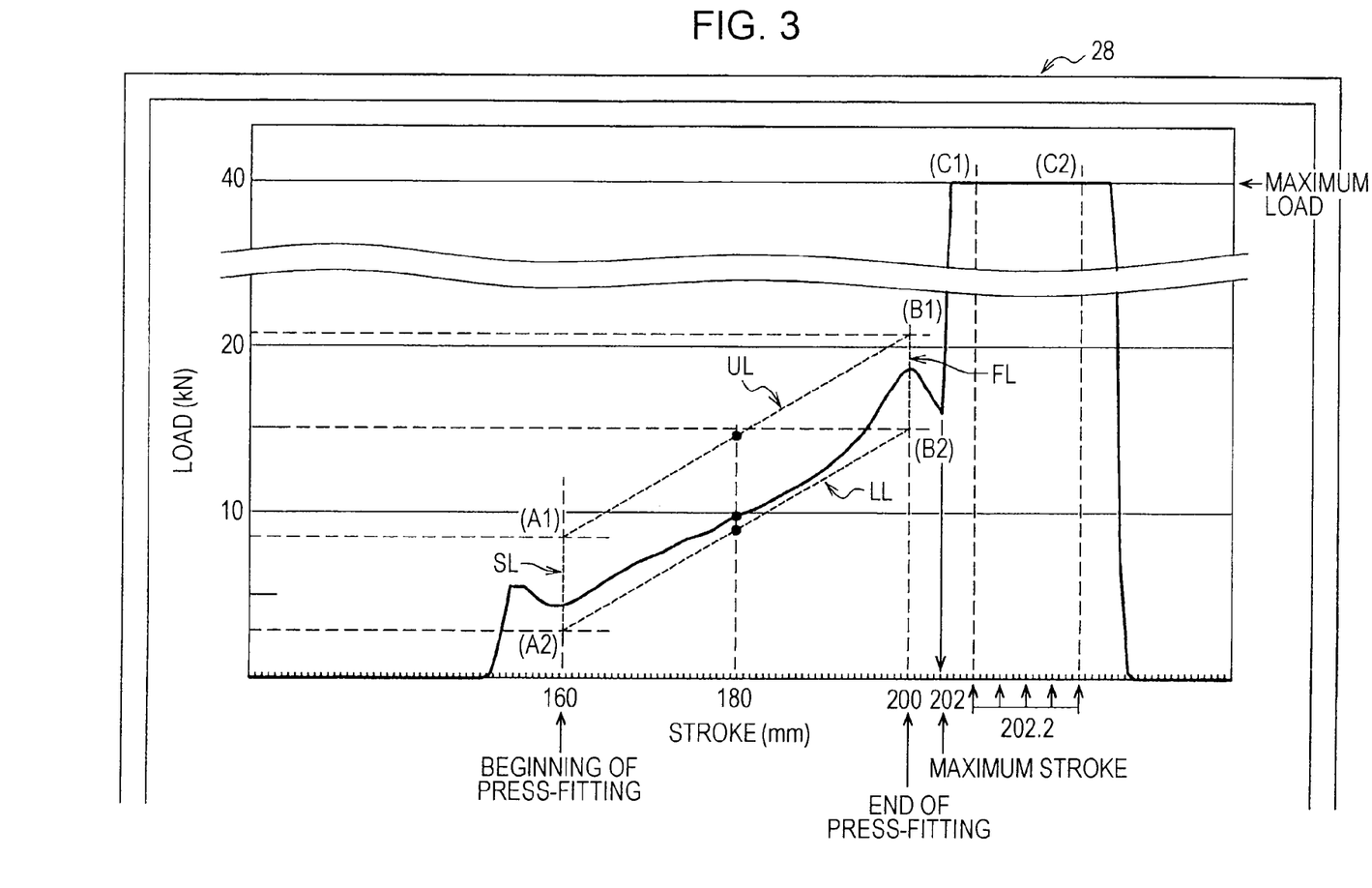
FIG. 3 is a graph displayed on a monitor that indicates the status of an actually measured load corresponding to an actually measured stroke input by input means in relation to press-fitting conditions of the bushing press-fitting inspection apparatus according to the embodiment of the present invention.

In addition, when setting the maximum load, the setting means 2 sets a setting time (for example, 0.5 second), which is a certain period of time during which the maximum load corresponding to the maximum stroke is applied, or the number of times of sampling (five times if the sampling is performed every 0.1 second) of the maximum load corresponding to the maximum stroke. Each value set by the setting means 2 is stored by the storage means 3. When the stroke at the beginning of press-fitting, the stroke at the end of press-fitting, and the maximum stroke are, for example, 160 mm, 200 mm, and 202 mm, respectively, the setting means 2 sets a load corresponding to each of the strokes as illustrated in FIG. 3 as an example.

The storage means 3 stores each value set by the setting means 2. The storage means 3 may be, for example, a commonly used memory such as a hard disk or an optical disk that is capable of storing each value.

The actually measured stroke and the actually measured load transmitted from the encoders 26 and the load cells 27 are input to the input means 4. The input means 4 then outputs, to the judgment means 5 (calculation means 5a, comparison means 5b, and the maximum load judgment means 6), the actually measured stroke and the actually measured load that have been input. The input means 4 also outputs, to the history writing means 8, the values of actually measured strokes and actually measured loads that have been input.

The judgment means 5 judges whether or not the actually measured load corresponding to the actually measured stroke is within the region of the press-fitting conditions (first press-fitting conditions) that has been set, and also judges, after the end of press-fitting, whether or not the press-fitting conditions (second press-fitting conditions) have been satisfied for the preset period of time during which the maximum load is applied. The judgment means 5 receives the press-fitting conditions that have been set in the storage means 3 by the setting means 2 and the actually measured load input from the input means 4, and outputs satisfactory-result signals or unsatisfactory-result signals to the output means 7 as the results of the judgments. Here, the judgment means 5 has the calculation means 5a, the comparison means 5b, and the maximum load judgment means 6.

The calculation means 5a calculates the region (lines UL and LL) of the press-fitting conditions from the first press-fitting conditions stored in the storage means 3. When the actually measured stroke and the actually measured load are input from the input means 4, the calculation means 5a obtains the values of the strokes at the beginning of press-fitting and at the end of press-fitting stored in the storage means 3. When a value of the actually measured stroke larger than the value of the stroke at the beginning of press-fitting is input, the calculation means 5a starts a calculation, and when a value of the actually measured stroke larger than the value of the stroke at the end of press-fitting is input, the calculation means 5a ends the calculation (represented by a portion of the graph extending from the beginning of press-fitting to the end of press-fitting in FIG. 3). The calculation means 5a also outputs a signal to the maximum load judgment means 6 to cause the maximum load judgment means 6 to begin to make a judgment. In the case of beginning a calculation again, the calculation means 5a is released from the termination state and prepares to start another calculation when a value of the actually measured stroke larger than the preset value of the stroke at the end of press-fitting is input and then a value of the actually measured stroke smaller than the preset value of the stroke at the beginning of press-fitting is input. When a value of the actually measured stroke larger than the preset value of the stroke at the beginning of press-fitting, the calculation means 5a starts the calculation again.

With respect to the calculation, the calculation means 5a obtains points that indicate four loads, namely the start point upper load, the start point lower limit load, the end point upper limit load, and the end point lower limit load from the storage means 3. The calculation means 5a calculates the lines UL and LL (refer to FIG. 3) from the points that indicate the four loads. The calculation means 5a also calculates intersection points at which a line corresponding to a value of the actually measured stroke input from the input means 4 crosses the lines UL and LL that have been calculated. The calculation means 5a outputs the values of these intersection points on the lines UL and LL crossed by the line corresponding to a value of the actually measured stroke to the comparison means 5b as the region of the press-fitting conditions. It is to be noted that since the region of the press-fitting conditions remains the same until the type of the bushings B is changed, the calculation means 5a may store the formula of the lines UL and LL that have been calculated once and may calculate only the intersection points on the lines UL and LL upon input of a value of the actually measured stroke. The calculation means 5a also outputs the calculated values to the history writing means 8, which will be described later.

The comparison means 5b performs a comparison in order to judge whether or not a value of the actually measured load that corresponds to a value of the actually measured stroke is within the range of the values of the two intersection points on the lines UL and LL that correspond to the actually measured stroke and that have been calculated by the calculation means 5a. After performing the comparison between the values of the two intersection points input from the calculation means 5a and the value of the actually measured load input from the input means 4, the comparison means 5b outputs a satisfactory-result signal to the output means 7 if the actually measured load is judged to be within the range, or outputs an unsatisfactory-result signal to the output means 7 if the actually measured load is outside the range. The comparison means 5b also outputs the result to the history writing means 8, which will be described later. Here, as illustrated in FIG. 3, the comparison means 5b receives the values of the intersection points on the lines UL and LL at a time when the stroke is, for example, 180 mm from the calculation means 5a as the results of calculation. When an actually measured load of 10 kN that corresponds to an actually measured stroke of 180 mm is input, the comparison means 5b compares the values of the intersection points on the lines UL and LL and the value of the actually measured load, which is 10 kN, in order to judge whether or not the value of the actually measured load is within the range of the values of the intersection points.

Upon input of a signal from the calculation means 5a, the maximum load judgment means 6 obtains the value of the maximum load corresponding to the maximum stroke from the storage means 3. The maximum load judgment means 6 then compares the value of the maximum load with a value of the actually measured load corresponding to a value of the actually measured stroke input from the input means 4 in order to judge whether or not the value (setting value) of the maximum load continues for a predetermined period of time (the number of times of sampling). Here, as illustrated in FIG. 3, the maximum load judgment means 6 judges whether or not a setting time of 0.5 second (a number of times of sampling of five) has elapsed since the actually measured load reaches a maximum load of 40 kN at an actually measured stroke (maximum stroke) of 202 mm (plus or minus 0.2%).

As illustrated in FIG. 3, for example, it is determined that the actually measured load has remained at 40 kN for 0.5 second (a number of times of sampling of five), which has been measured by a counter, at a maximum stroke of 202.2 mm (plus or minus 0.2% of the maximum load) after the actually measured stroke exceeded 200 mm, which is a stroke corresponding to a load at the end of press-fitting. At this time, the maximum load judgment means 6 judges that the press-fitting operation has been completed and outputs a satisfactory-result signal to the output means 7. When outputting the satisfactory-result signal to the output means 7, the maximum load judgment means 6 also outputs a signal that indicates that the judgment has been completed to the calculation means 5a and prepares for the next operation.

The output means 7 receives signals from the judgment means 5 (the comparison means 5b and the maximum load judgment means 6) and, in accordance with the received signals, outputs indication signals for operating the indication means 29 of the bushing press-fitting apparatus 20. When a satisfactory-result signal is transmitted from the comparison means 5b or from the maximum load judgment means 6, the output means 7 outputs an indication signal corresponding to the satisfactory-result signal in order to cause the indication means 29 to, for example, light up in blue or not to light up, thereby indicating that the normal operation is performed. On the other hand, when an unsatisfactory-result signal is transmitted from the comparison means 5b, the output means 7 outputs an indication signal corresponding to the unsatisfactory-result signal in order to cause the indication means 29 to, for example, light up in red. Furthermore, when the output means 7 receives a satisfactory-result signal from the maximum load judgment means 6, the output means 7 outputs an indication signal corresponding to the satisfactory-result signal in order to cause the indication means 29 to, for example, light up in green. It is to be noted that the output means 7 has a counter, which is not illustrated, and may cause the indication means 29 to light up in white when it is determined by the counter that four satisfactory-result signals have been transmitted from the judgment means 5, thereby indicating that the press-fitting operation for two of the workpieces W has been completed.

The history writing means 8 not only causes the storage means 3 to store, together with each piece of data that has been set, the history of the actually measured load corresponding to the actually measured stroke for the bushings B that have been press-fitted, but also causes the monitor (a touch panel, or display input means) 28 of the bushing press-fitting apparatus 20 to display the history. The history writing means 8 writes each value transmitted from the input means 4, the calculation means 5a, and the comparison means 5b in preset display data or in a preset table, in order to store the history or to display the history.

In the bushing press-fitting apparatus 20, as illustrated in FIG. 2, each of the workpieces W is configured to, for example, have two bushing press-fitting portions, namely the bushing press-fitting portions Wa and Wb. When either of the left and right press-fitting mechanisms 25 is performing press-fitting work, the other is configured to be preparing for press-fitting, so that the bushings B are alternately press-fitted into the bushing press-fitting portions Wa and Wb. Therefore, the bushing press-fitting inspection device 1 inspects the press-fitting status every time that the press-fitting work of the bushings B is performed. The operation of the bushing press-fitting inspection device 1 will be described hereinafter with reference to FIG. 4, along with reference to FIGS. 1 to 3 as necessary.

Figure 4:
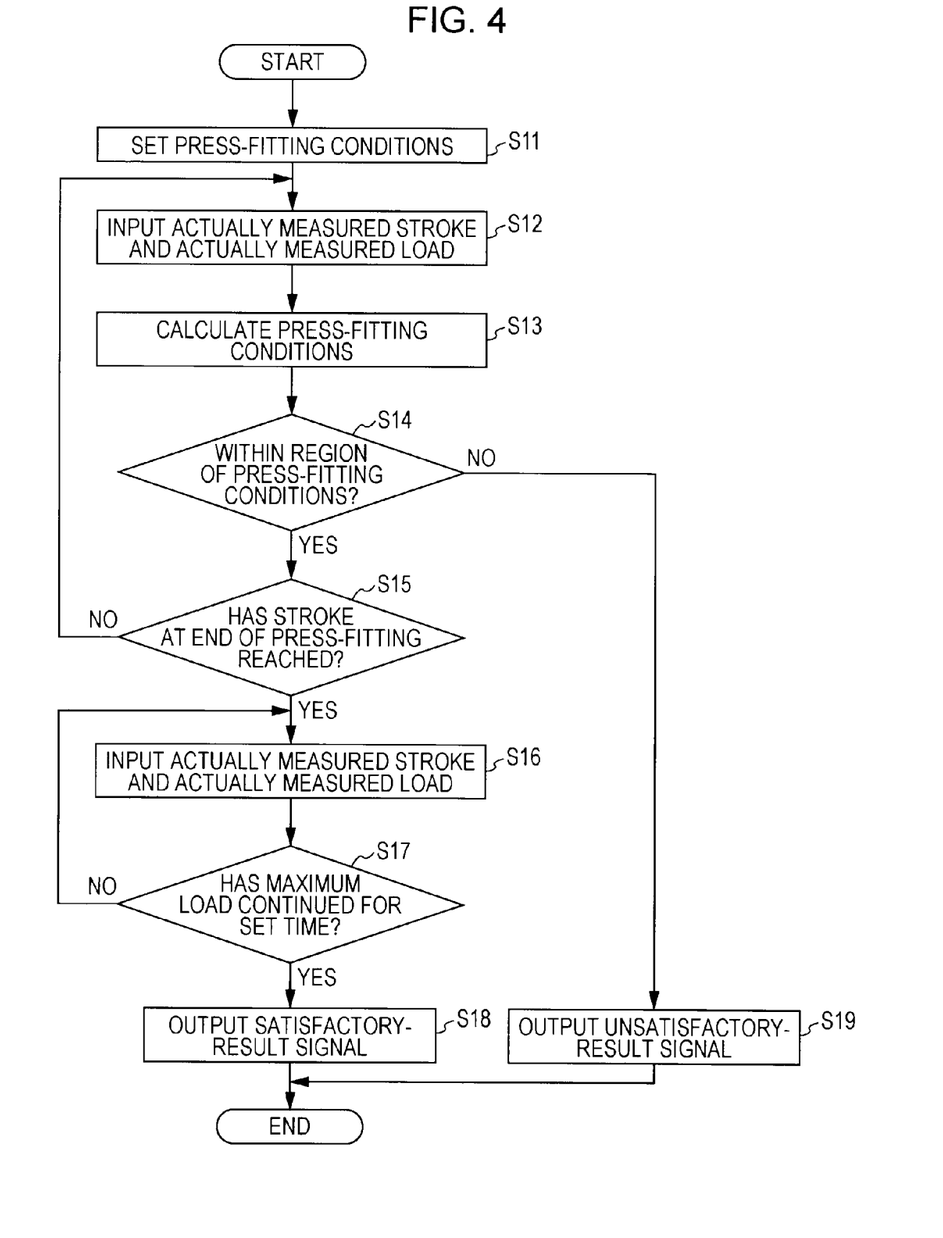
FIG. 4 is a flowchart illustrating the operation flow of the bushing press-fitting inspection device according to the embodiment of the present invention.

First, in the bushing press-fitting apparatus 20, the press-fitting conditions of the bushing press-fitting inspection device 1 are set as illustrated in FIG. 4 (step S11).

The press-fitting conditions are set by inputting the press-fitting conditions from the monitor 28, which is a touch panel. For example, as illustrated in FIG. 3, the stroke at the beginning of press-fitting is 160 mm, the stroke at the end of press-fitting is 200 mm, the maximum stroke is 202 mm, and the maximum load corresponding to the maximum stroke is 40 kN. In addition, as the settings of the press-fitting conditions, a start point upper limit load (A1) and a start point lower limit load (A2) at the beginning of press-fitting, an end point upper limit load (B1) and an end point lower limit load (B2) at the end of press-fitting, the maximum load at the maximum stroke, and the number of times of sampling (or a period of time: for example, 0.5 second or five times) when the maximum load is reached are input and stored in the storage means 3.

In addition, in the bushing press-fitting apparatus 20, the bushings B are prepared in the left and right bushing aligning mechanisms 23, and the workpieces W are mounted on the support mechanism 21 for preparation.

When the bushing press-fitting apparatus 20 has completed the preparation, actual press-fitting work is started. The bushing press-fitting apparatus 20 performs the press-fitting operation using the press-fitting mechanisms 25 that alternately press-fit the bushings B into the bushing press-fitting portion Wa located on one side of each of the workpieces W and the bushing press-fitting portion Wb located on the other side. In the press-fitting work, as illustrated in FIG. 2, the lubricant applying mechanisms 24 receive, with the handlers 24a thereof, the bushings B aligned by the bushing aligning mechanisms 23 and apply lubricant to certain positions of the bushings B. The lubricant applying mechanisms 24 then deliver the bushings B to the press-fitting mechanisms 25, which start a press-fitting operation. When the press-fitting operation is performed, the bushing press-fitting inspection device 1 constantly inspects the press-fitting statuses of the bushings B. When the press-fitting mechanisms 25 begin to operate, the drive motors 25d drive and rotate the driving shafts and lower the rods 25b through the transmission means 25e. The rods 25b that support the bushings B are further lowered, so as to press-fit the bushings B into, for example, the bushing press-fitting portion Wa in the workpieces W.

When the press-fitting operation is started, the bushing press-fitting inspection device 1 operates in the following manner. That is, as illustrated in FIGS. 2 and 4, when the actually measured load corresponding to the actually measured stroke is input from the encoders 26 and the load cells 27 of the press-fitting mechanisms 25 through the input means 4 (step S12), the calculation means 5a of the judgment means 5 obtains the press-fitting conditions stored in the storage means 3.

In the bushing press-fitting inspection device 1, the calculation means 5a of the judgment means 5 then calculates the line LL (refer to FIG. 3) connecting the start point lower limit load to the end point lower limit load and the line UL (refer to FIG. 3) connecting the start point upper limit load to the end point upper limit load. The calculation means 5a also calculates the intersection points on the lines UL and LL corresponding to the actually measured stroke and outputs the intersection points to the comparison means 5b (step S13). After that, in the bushing press-fitting inspection device 1, when the calculated values are input to the comparison means 5b, the comparison means 5b compares the values with the actually measured load input from the input means 4 in order to judge whether or not the actually measured load is within the region of the press-fitting conditions (step S14). In the bushing press-fitting inspection device 1, if it has been judged in step S14 that the actually measured load is outside the region of the press-fitting conditions as a result of the judgment, an unsatisfactory-result signal is output to the output means 7 (step S19), and the output means 7 causes the indication means 29 to indicate that the press-fitting operation has not been satisfactorily performed.

In addition, if it has been judged in step S14 that the actually measured load is within the region of the press-fitting conditions, the calculation means 5a judges whether or not the value of the actually measured stroke has reached that of the stroke at the end of press-fitting (for example, 200 mm in the case illustrated in FIG. 3) (step S15). If the actually measured stroke has not reached the stroke at the end of press-fitting, the operation is repeated from step S12 (No in step S15). On the other hand, if the actually measured stroke has reached the stroke at the end of press-fitting (YES in step S15), the calculation means 5a outputs a signal that indicates that the actually measured stroke has reached the stroke at the end of press-fitting to the maximum load judgment means 6, so as to stop the calculation.

When the signal is transmitted from the calculation means 5a, the maximum load judgment means 6 compares, on the basis of the actually measured load that corresponds to the actually measured stroke and that is input from the input means 4 (step S16), the actually measured load that has been input with the maximum load and the setting time (the setting number of times of sampling) stored in the storage means 3, in order to judge whether or not the setting time has elapsed with the maximum load being applied (step S17). If the result of the judgment made by the maximum load judgment means 6 is that the setting time has not elapsed (NO in step S17), the operation is repeated from step S16. On the other hand, if the result of the judgment made by the maximum load judgment means 6 is that the setting time has elapsed (YES in step S17), a satisfactory-result signal is output to the output means 7 (step S18), and the output means 7 causes the indication means 29 to indicate that the press-fitting has been satisfactorily performed.

Furthermore, in the bushing press-fitting apparatus 20, since the press-fitting operation is performed for the left and right bushing press-fitting portions Wa and Wb of the workpieces W, the press-fitting operation of the bushings B for each of the workpieces W is complete when the above-described steps S11 to S19 have been performed twice. Here, for example, when two of the workpieces W are supported by the support mechanism 21, the operation from step S11 to step S19 is performed four times.

In addition, in the bushing press-fitting inspection device 1, the actually measured load corresponding to the actually measured stroke is stored in the storage means 3 in relation to the press-fitting conditions that have been set and can be sequentially displayed on the monitor 28 by the history writing means 8 as illustrated in FIG. 1, a worker can recognize the press-fitting statuses of the bushings B by watching the monitor 28.

As has been described above, the bushing press-fitting inspection device 1 can use the actually measured stroke and the actually measured load of the bushing press-fitting apparatus 20 as input information by using servo cylinders, and can judge whether or not the press-fitting conditions have been satisfied in the region extending from the beginning of press-fitting of a bushing to the end of press-fitting of the bushing. Therefore, the press-fitting statuses of the bushings B can be inspected over a wide range. It is to be noted that although an example in which servo cylinders are used has been described, hydraulic cylinders may be used instead and a configuration described above in which a region is used for a judgment as press-fitting conditions may be adopted. However, when servo cylinders are used, the configuration is simple and the control is easy compared to when hydraulic cylinders are used, which is advantageous.

It is to be noted that the bushing press-fitting inspection device 1 may be configured by a central processing unit (CPU), a random-access memory (RAM), a read-only memory (ROM), and so forth that are commonly used. Therefore, outputting of an indication signal can be realized by a program (a bushing press-fitting inspection program) that causes a computer to function as the above-described means.

What is claimed is:

1. A bushing press-fitting inspection device used in a bushing press-fitting apparatus that, using a press-fitting mechanism, supports a bushing at an end of the bushing press-fitting apparatus and that press-fits, over a certain stroke at a certain load, the bushing into a bushing press-fitting portion formed in part of a structure in a cylindrical shape that is included in a workpiece, the bushing press-fitting inspection device comprising:

setting means for setting a start point lower limit load and a start point upper limit load, which are represented by a relationship between a stroke and a load at the beginning of press-fitting of the bushing that is to be press-fitted using the press-fitting mechanism, and an end point lower limit load and an end point upper limit load, which are represented by a relationship between a stroke and a load at the end of press-fitting of the bushing, as press-fitting conditions;

storage means for storing the press-fitting conditions set by the setting means;

input means for, after the press-fitting mechanism begins to operate, inputting an actually measured stroke and an actually measured load corresponding to the actually measured stroke that have been detected by detection means provided in the press-fitting mechanism;

judgment means for judging, by performing a comparison, whether or not the actually measured load that corresponds to the actually measured stroke and that has been input by the input means is within a region of the press-fitting conditions; and output means for, when a result of the judgment made by the judgment means is that the actually measured load is outside the region of the press-fitting conditions, outputting an indication signal to indication means provided in the press-fitting mechanism after receiving an unsatisfactory-result signal from the judgment means, and, when the result of the judgment made by the judgment means is that the actually measured load is within the region of the press-fitting conditions, outputting an indication signal to the indication means provided in the press-fitting mechanism after receiving a satisfactory-result signal from the judgment means.

2. The bushing press-fitting inspection device according to claim 1,
wherein the judgment means includes
calculation means for calculating a region between a line connecting the start point lower limit load to the end point lower limit load and a line connecting the start point upper limit load to the end point upper limit load as the press-fitting conditions; and
comparison means for judging, by performing a comparison, whether or not the actually measured load that corresponds to the actually measured stroke and that has been input by the input means is within the region of the press-fitting conditions calculated by the calculation means.

3. A bushing press-fitting apparatus comprising:
a support mechanism that supports a workpiece having a bushing press-fitting portion formed in part of a structure in a cylindrical shape included in the workpiece;
a workpiece fixing mechanism that fixes in place the workpiece supported by the support mechanism;
a bushing aligning mechanism that aligns bushings to be press-fitted into the bushing press-fitting portion with one another;
a press-fitting mechanism that receives the bushing from the bushing aligning mechanism and press-fit the bushing into the bushing press-fitting portion of the workpiece that is supported by the support mechanism and that is fixed in place by the workpiece fixing mechanism; and
a bushing press-fitting inspection device according to claim 1.

4. The bushing press-fitting inspection device according to claim 2,
wherein the judgment means further includes maximum load judgment means for judging, on the basis of a maximum load that indicates a maximum applied load corresponding to a maximum stroke of the press-fitting mechanism and a period of time during which the maximum load is applied, whether or not a press-fitting operation for the workpiece has been completed,
wherein the setting means sets the maximum load corresponding to the maximum stroke and the period of time during which the maximum load is applied, and
wherein, when the actually measured load input from the input means has reached the maximum load and the period of time, which has been set, during which the maximum load is applied has elapsed, the maximum load judgment means outputs a satisfactory-result signal to the output means.

5. The bushing press-fitting inspection device according to claim 4,
wherein, upon receiving satisfactory-result signals output from the maximum load judgment means and from the judgment means, the output means outputs, to the indication means, indication signals that are different when the satisfactory-result signal is output from the maximum load judgment means and when the satisfactory-result signal is output from the judgment means.

6. The bushing press-fitting inspection device according to any of claims 4 to 5, further comprising:
history writing means for causing the storage means to store the actually measured stroke and the actually measured load,
wherein the history writing means causing the storage means to store each value used for the judgments made by the judgment means and the maximum load judgment means.

7. A bushing press-fitting inspection program for inspecting a press-fitting status of a bushing used in a bushing press-fitting apparatus that, using a press-fitting mechanism, supports a bushing at an end of the bushing press-fitting apparatus and that press-fits, over a certain stroke at a certain load, the bushing into a bushing press-fitting portion formed in part of a structure in a cylindrical shape that is included in a workpiece, the bushing press-fitting inspection program comprising a non-transitory computer readable medium containing computer instructions stored therein for causing a computer to function as:
setting means for setting, in storage means, a start point lower limit load and a start point upper limit load, which are represented by a relationship between a stroke and a load at the beginning of press-fitting of the bushing that is to be press-fitted using the press-fitting mechanism, and an end point lower limit load and an end point upper limit load, which are represented by a relationship between a stroke and a load at the end of press-fitting of the bushing, as press-fitting conditions;
input means for, after the press-fitting mechanism begins to operate, inputting an actually measured stroke and an actually measured load corresponding to the actually measured stroke that have been detected by detection means provided in the press-fitting mechanism;
calculation means for calculating, when the actually measured load corresponding to the actually measured stroke is input by the input means, a region between a line connecting the start point lower limit load to the end point lower limit load and a line connecting the start point upper limit load to the end point upper limit load as the press-fitting conditions;
comparison means for judging, by performing a comparison, whether or not the actually measured load that corresponds to the actually measured stroke and that has been input by the input means is within the region of the press-fitting conditions calculated by the calculation means; and output means for, when a result of the comparison performed by the comparison means is that the actually measured load is within or outside the region of the press-fitting conditions, outputting an indication signal to indication means provided in the press-fitting mechanism after receiving a satisfactory-result signal or an unsatisfactory-result signal, respectively, from the comparison means.

8. A bushing press-fitting inspection method for inspecting a press-fitting status of a bushing used in a bushing press-fitting apparatus that, using a press-fitting mechanism, press-fits, over a certain stroke at a certain load, a bushing into a bushing press-fitting portion, the bushing press-fitting inspection method comprising the steps of controlling a computer for:

setting, in storage means of the computer, a region between a line connecting a start point lower limit load to a start point upper limit load, which are represented by a relationship between a stroke and a load at the beginning of press-fitting of the bushing that is to be press-fitted using the press-fitting mechanism, and a line connecting an end point lower limit load to an end point upper limit load, which are represented by a relationship between a stroke and a load at the end of press-fitting of the bushing, as press-fitting conditions by using setting means;

inputting, by using input means of the computer, an actually measured stroke and an actually measured load corresponding to the actually measured stroke that are indicated by the press-fitting mechanism that has begun to operate;

judging, by performing a comparison using judgment means of the computer, whether or not the actually measured stroke and the actually measured load that have been input by the input means are within the region of the press-fitting conditions stored in the storage means; and outputting, when a result of the judgment performed using the judgment means is that the actually measured load is outside the region of the press-fitting conditions, an unsatisfactory-result signal to indication means provided in the press-fitting mechanism by using output means of the computer, and, when the actually measured load is within the region of the press-fitting conditions, outputting a satisfactory-result signal to the indication means provided in the press-fitting mechanism by using the output means.

* * * * *